United States Patent
Jordan et al.

(10) Patent No.: US 9,336,287 B2
(45) Date of Patent: May 10, 2016

(54) SYSTEM AND METHOD FOR MERGING NETWORK EVENTS AND SECURITY EVENTS VIA SUPERIMPOSING DATA

(71) Applicant: SecurityDo Corp., Great Falls, VA (US)

(72) Inventors: Christopher Jordan, Great Falls, VA (US); Kun Luo, College Park, MD (US)

(73) Assignee: SecurityDo Corp., Great Falls, VA (US)

( * ) Notice: Subject to any disclaimer, the term of this patent is extended or adjusted under 35 U.S.C. 154(b) by 71 days.

(21) Appl. No.: 14/497,060

(22) Filed: Sep. 25, 2014

(65) Prior Publication Data

US 2015/0088868 A1    Mar. 26, 2015

Related U.S. Application Data

(60) Provisional application No. 61/882,983, filed on Sep. 26, 2013.

(51) Int. Cl.
```
G06F 15/173    (2006.01)
G06F 17/30     (2006.01)
H04L 29/06     (2006.01)
G06F 17/21     (2006.01)
```

(52) U.S. Cl.
CPC .... *G06F 17/30554* (2013.01); *G06F 17/30321* (2013.01); *G06F 17/30327* (2013.01); *G06F 17/30595* (2013.01); *G06F 17/30899* (2013.01); *H04L 63/1408* (2013.01); *G06F 17/218* (2013.01)

(58) Field of Classification Search
CPC ................ G06F 17/30; G06F 17/3086; G06F 17/30899; G06F 17/30321; G06F 17/30327

USPC .................................. 709/202–203, 223–224
See application file for complete search history.

(56) References Cited

U.S. PATENT DOCUMENTS

| | | | |
|---|---|---|---|
| 6,549,944 B1* | 4/2003 | Weinberg et al. | 709/224 |
| 7,272,659 B2* | 9/2007 | Fukuoka | G06F 17/30899 709/231 |
| 2003/0149678 A1* | 8/2003 | Cook | A61B 5/04012 702/187 |
| 2004/0201591 A1* | 10/2004 | Fukuoka | 709/203 |
| 2010/0010853 A1* | 1/2010 | Yano | 705/7 |
| 2010/0094981 A1* | 4/2010 | Cordray | G06F 15/177 709/224 |
| 2013/0282794 A1* | 10/2013 | Ando | H04L 67/10 709/203 |
| 2015/0046099 A1* | 2/2015 | Kamoi | G06Q 50/06 702/34 |

\* cited by examiner

*Primary Examiner* — Bharat N Barot
(74) *Attorney, Agent, or Firm* — Slater Matsil, LLP (57) ABSTRACT

An integrated network flow and security information management system and method is provided, more particularly, an integrated network flow and security information management system and method which leverages a process of superimposing and cross referencing common events and attributes in order to increase the speed of searches, completeness of searches and size of dataset (flow data). In particular, the process of superimposing may increase the amount of information that can be processed, while accelerating the search, thereby providing the user with more responsive acts of pivoting and scoping leading to a more complete response to network errors and threats.

19 Claims, 5 Drawing Sheets

```
{
  "sip": "192.168.1.7",
  "dip": "174.53.71.66",
  "sp": 1034,
  "dp": 80,
  "prot": 6,
  "start_ms": 1319503733312,
  "txB": 566,
  "txP": 6,
  "rxB": 540,
  "rxP": 5,
  "totalB": 1106,
  "dur": 4575,
  "http": {
    "host": "gghjfyagmcp.com",
    "agent": "Mozilla/4.0 (Windows XP 5.1) Java/1.6.0",
    "uris": [
      {
        "cmd": "GET",
        "uri": "/content/field.jar",
        "status": 404,
        "t": "text/html"
      }
    ]
  },
  "d_country": "US",
  "d_city": "Huntington",
  "d_org": "Comcast Cable",
  "d_isp": "Comcast Cable"
}
```

These attributes (sip, dip, sp, dp, prot) are used to derive the index.

*FIG. 4*

| Host Summary |
| --- |
| Date |
| Tue, Oct 25 2011 12:48 AM |

First Seen:Tue, Oct 25 2011 12:48 AM
Last Seen:Tue, Oct 25 2011 1:09 AM
Incidents: (Kazy)
Sips: 192.168.1.7 (100.0%)
ResolvedIp:6
190.189.60.56 (30.0%)
68.54.176.107 (Fastflux)(25.0%)
174.53.71.66 (Fastflux)(Residential)(20.0%)
209.127.80.51 (15.0%)
79.184.18.219 (Fastflux)(5.0%)
69.11.56.183 (Fastflux)(5.0%)
Ports Open: 80 (100.0%)
25385: EXPLOIT-KIT Multiple exploit kit Payload detection - calc.exe (Exploit Kit)
23612:FILE-PDF JavaScript contained in an xml template embedded in a pdf attempt (Exploit Kit)
25383:EXPLOIT-KIT Multiple exploit kit Payload detection - info.exe (Exploit Kit)
exe:81920 Bytes : Positives:32    0c5c3b87cc83adf678d54c50d3650b64
pdf:11964 Bytes : Positives:33    04497fda2aee8572c2f0ab93a4a58357
exe:77824 Bytes : Positives:38    1f42a6c620ea23594885b836e10c0aa4

*FIG. 5*

```
+⊞⊕⚐⚑      23:37:31.443 192.168.1.255 192.168.1.3     138  netbios UDP  0     648   648   8.5s
+⊞⊕⚐⚑▦ 23:37:35.543 192.168.1.7  208.115.198.124 1042 http    TCP  2.5K  104.0K 106.5K 1m
 Host: peopleofmymarsplanet.com  🔍
 Agent: Mozilla/4.0 (compatible; MSIE 6.0; Windows NT 5.1; SV1)
 URIs:1  ˅
 exe:101888 Bytes ; Positives:39  ⬇ 2b8585577efac230db63650a3dbaa295  🔍 🔍
 25386:EXPLOIT-KIT Multiple exploit kit Payload detection - about.exe  🔍 ˅
{
   "sip": "192.168.1.7",
   "dip": "208.115.198.124",
   "sp": 1042,
   "dp": 80,
   "prot": 6,
   "start_ms": 1319600255543,
   "txB": 2532,
   "txP": 43,
   "rxB": 106491,
   "rxP": 77,
   "totalB": 109023,
   "dur": 67807,
   "http": {
      "host": "peopleofmymarsplanet.com",
      "agent": "Mozilla/4.0 (compatible; MSIE 6.0; Windows NT 5.1; SV1)",
      "uris": [
         {
            "cmd": "GET",
            "uri": "/w.php",
            "status": 200,
            "t": "application/x-msdownload",
            "file": {
               "file_type": "exe",
               "md5": "2b8585577efac230db63650a3dbaa295",
               "size": 101888,
               "positives": 39
            }
         }
      ]
   },
   "alerts": [
      {
         "sid": "25386",
         "msg": "EXPLOIT-KIT Multiple exploit kit Payload detection - about.exe",
         "classification": "A Network Trojan was Detected"
      }
   ],
   "files": [
      {
         "file_type": "exe",
         "md5": "2b8585577efac230db63650a3dbaa295",
         "size": 101888,
         "positives": 39
      }
   ],
   "d_country": "US",
   "d_city": "Dallas",
   "d_org": "Limestone Networks",
   "d_isp": "Limestone Networks"
}
```

*FIG. 6*

SYSTEM AND METHOD FOR MERGING NETWORK EVENTS AND SECURITY EVENTS VIA SUPERIMPOSING DATA

CROSS REFERENCE TO RELATED APPLICATION

This application claims the benefit under 35 U.S.C. §119(e) of U.S. Provisional Patent Application Ser. No. 61/882,983 filed on Sep. 26, 2013, entitled "Systems and Methods for Employing Super Imposed Data," which is incorporated by reference in its entirety.

FIELD OF THE DISCLOSURE

The present disclosure generally relates to enhancing analysis of security and network events. More specifically, the present disclosure may facilitate the merger of network and security events both pre- and post-data storage in a format that may allow a resulting extremely large dataset to be analyzed faster by bypassing the need to join datasets, which may create size and time complexity.

BACKGROUND

The management of security information and security events has progressed into two approaches. One approach is the security information and event management (SIEM) system that collects security related information into a relational database and allows the analyst to analyze events by querying a database. A second technique is by indexing log messages, allowing predefined signatures to trigger on incoming events, and having an analyst then search the indexed logs for details. These approaches to managing security information and events are limited to only alerts and system log messages, which is a small subset of the overall activity of a network.

Figure 2:
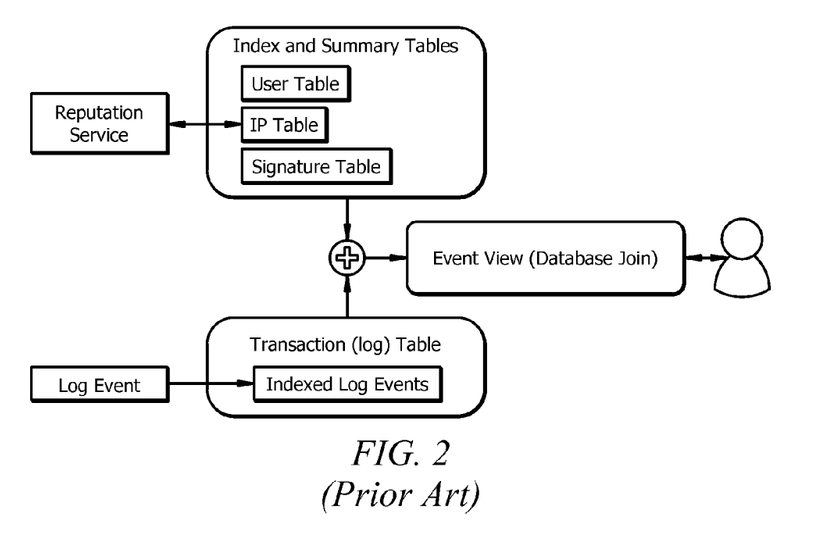
FIG. 2 depicts using joins to create a view.

Security information and event management (SIEM) leverages high-speed relational databases. In a relational database, when an event occurs (i.e., something that is known to be bad or suspicious), the database is queried to validate that an incident has occurred. In a SIEM process (such as depicted in FIG. 2): (a) log events may be added to a event log or table; (b) reputation and validation engines review incoming information to generate a new record in a related table; and (c) queries are performed over the joined tables and results are given to a user to view or correlate. A SIEM may use a transaction table for handling flow data. A transaction table is a table that inserts events directly into the table without modification. The information may be cross-indexed and then joined when the user searches and fetches data. In the SIEM process, data is not preprocessed before storage, just merely indexed. These processes do not merge different data sources into a single table.

Security information management has generally involved leveraging a database to store event data and then joining the known reputational and analysis data. The process of using relational joins becomes apparent as the correlation rules of these systems are defined as structured query language (SQL) operations leveraging joins.

Figure 3:
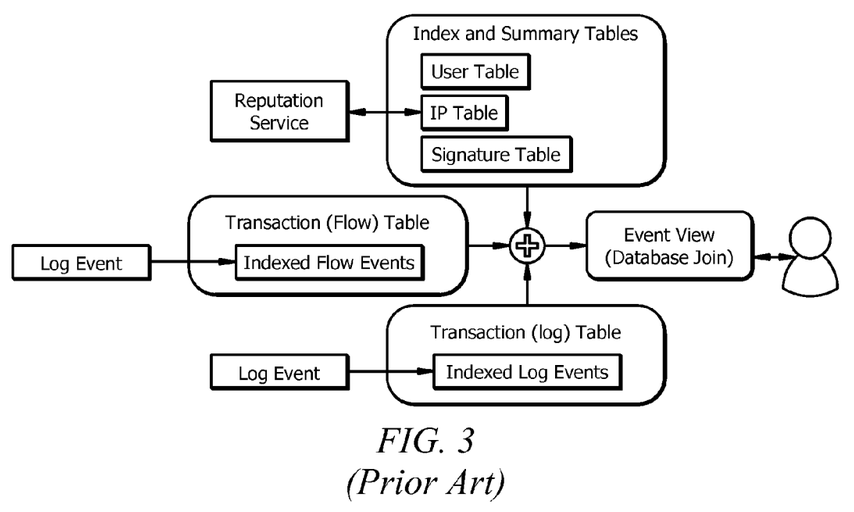
FIG. 3 depicts using a transaction table to join events.

In a flow process (as depicted in FIG. 3): (a) log events may be added to a event log or table unique from a flow log or table; (b) flow events may be added to a flow log or table unique from the event log or table; (c) reputation and validation engines review incoming information to generate new records in a related table; and (d) queries are performed over the joined tables and results are given to the user to view or correlate.

Flow analytics also may be employed to see events that were not detected by other log producers. Such an example is SRI MetaFlows (http://www.metaflows.com/) and Lancope (http://www.lancope.com/products/stealthwatch-system/). Commercially, deep packet inspection engines, like RSA/NetWitness and Solara, are flow analytic systems, including RSA Security Analytics and Solara DeepSee respectively. These systems generate their flow data from the packet captures and then present related knowledge to the user. These approaches are very similar to the relational database approach as they are joining tables of data.

Flow data techniques were the backbone of the Government's Einstein Project. It was based on the flow analysis research done by Carnegie Mellon's Computer Emergency Response Team (CERT). This is the System for Internet-Level Knowledge (http://tools.netsa.cert.org/silk/). The merger of SILk and Snort Alerts (intrusion detection alerts) was an earlier implementation of this approach.

SUMMARY

Embodiments of the present disclosure may provide a method for gathering a plurality of data and representing the results, the method comprising collecting events sharing the same derived key in a pre-defined sliding window; superimposing the events in the pre-defined sliding window into a single record to form superimposed events prior to the storing of data to a data store (as noted in FIG. 1); and superimposing attributes from the plurality of data into an aggregated summary structure to form superimposed attributes as part of the superimposed process. These results themselves may be superimposed with tags prior to results being delivered to the user or requesting process.

The plurality of data may be selected from the group comprising security event data, network event data, actionable intelligence, and analysis results. Events may be messages that contain a flow tuple. The flow tuple may be the source address/port, destination address/port, and protocol.

The method may further comprise adding tagged data to the retrieved superimposed event or attribute summary prior to viewing, wherein impermanent data is not attached to the retrieved superimposed event or attribute summary.

Further embodiments of the present disclosure may provide a method for superimposing and retrieving attributes prior to their storage in a data store (as noted in FIG. 1), the method comprising receiving data containing a plurality of attributes and related values; examining each of the plurality of attributes to identify associated attributes; and superimposing the associated attributes in a cross relationship. The cross relationship may be a collection of unique attribute pairings. Each of the plurality of attributes may have a pre-defined relationship schema that specifies the superimpose action to be taken for all associated attributes. The method may further comprise creating a new summary record within the current window prior to their storage in a data store (as noted in FIG. 1) when an examined attribute is new and does not exist in a current window. The method also may comprise superimposing all associated attributes to a corresponding record following a pre-defined relationship schema when an examined attribute exists in a current window. Each of the plurality of attributes may have a collection of cross relationships when stored in the data store. The method may further comprise converting the collection of cross relationships into a single tree structure and storing the single tree structure in the data store with the value associated with the attribute as its key.

Further embodiments of the present disclosure may provide a method for superimposing of tags on the results from searches, the method comprising: defining tag filters by processes or users in an independent schema, the independent schema defined as a condition and a label. The method may further comprise appending results by a label attached to tag filters, wherein the independent schema matches a result prior to the results being delivered to a user or a requesting process. A set of tag filters may be independent of a datastore schema for superimposed events and superimposed attributes summaries.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may support the merger and management of security event data, network event data, actionable intelligence, and/or analysis results collected from network security operations and network devices in order to increase the speed of searches, completeness of searches, and size of dataset (flow data) according to embodiments of the present disclosure. Specifically, embodiments of the present disclosure may allow large amounts of data in varying formats to be collected, stored, and analyzed. A user or remote process can search and filter superimposed data in order to perform scoping and pivoting as part of a process of analyzing and responding to network and security errors and threats according to embodiments of the present disclosure. Being able to manage and analyze greater amounts of information in a faster, more timely manner without loss of details may provide far more effective and complete analysis and response to security and network events in embodiments of the present disclosure.

In data analysis, the users (or analysts) may perform scoping and pivoting. Data analysis occurs after there is an event that needs to be examined. When analysts scope, they are trying to determine all related attributes and events related to a key event. Pivoting is when an analyst changes the scope by examining one of the related attributes. Pivoting helps an analyst to find other related events that do not have a direct relationship with the key event. Both scoping and pivoting are traditionally search intensive, and superimposed data may resolve according to embodiments of the present disclosure.

Superimposed Data (SID) is a process that may address the speed and completeness of human analysis and data analytics of extremely large volumes of data. In order to analyze data effectively, an analysis system should contain all available data. However, as the amount of data required for analysis grows, the ability to organize, store and retrieve data may become increasingly difficult. Traditional analysis solves this dilemma by simply reducing the data set or keeping the data in different datastores. This reduction in data set completeness may result in an incomplete response, as not all attributes or related event messages need to be provided by the result for completeness are necessarily contained in the reduced data subset. In the case that the dataset is not reduced, as in the case of using separated data store, the time spent in joining different data sources may be very long.

Implementation of a superimposed data (SID) process according to embodiments of the present disclosure may include the ability for implementing components of the process to run independently across multiple containers, allowing a distributed computer environment in a single or multiple integrated systems and/or network of systems. Embodiments of the present disclosure also may include processes illustrated in FIG. 1. However, it should be appreciated that there could be many different ways of implementing the flow due to asymmetric nature of the process according to embodiments of the present disclosure and its resulting analysis, and it should be appreciated that the present disclosure may not be limited to any one set of flows.

A superimposed data process according to embodiments of the present disclosure may organize, store, and retrieve to support comprehensive analysis in a timely and complete manner. SID may leverage many new advances in technology and may also overcome shortfalls in the analysis process of large datasets independent from technology advances. Using SID, scaling and integrating may occur at the level necessary to produce timely and comprehensive results.

Figure 1:
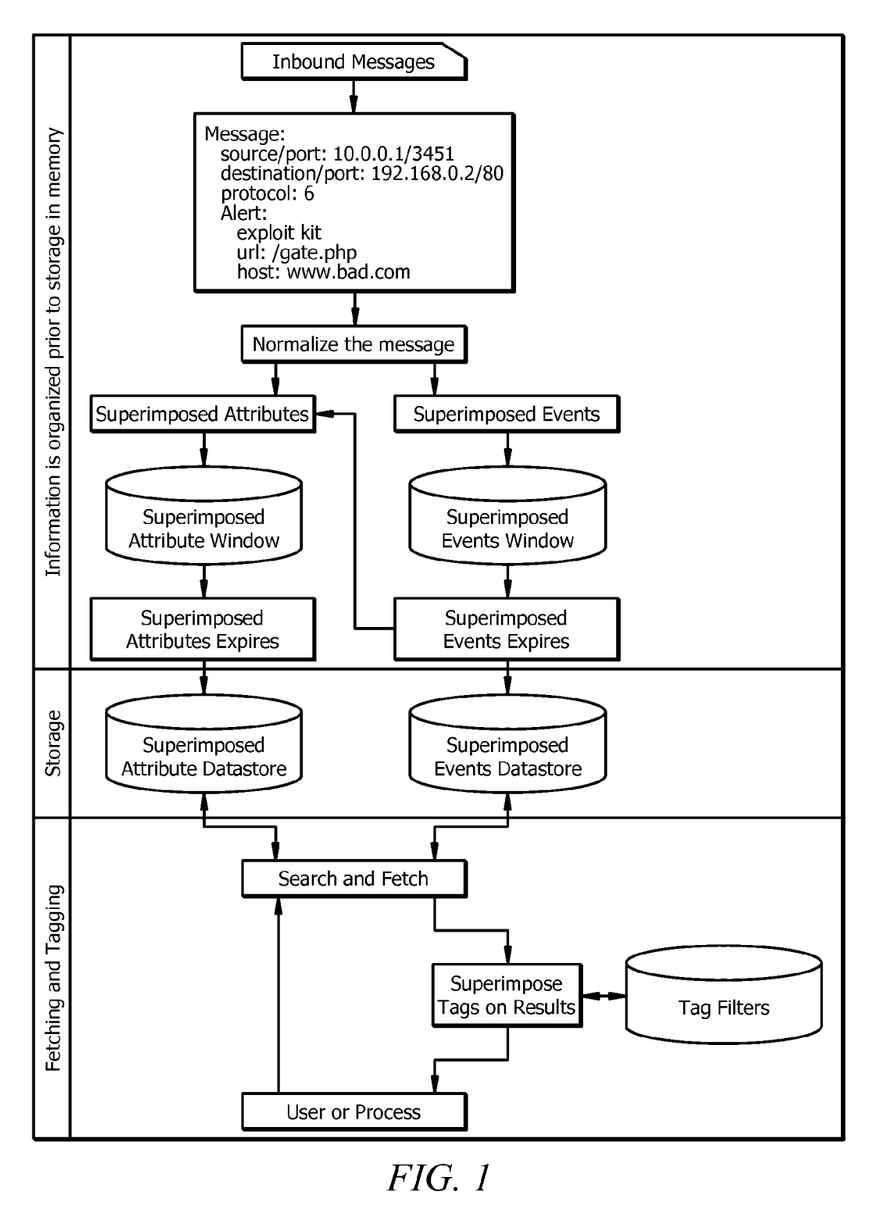
FIG. 1 depicts a high-level view of a superimposed data process according to an embodiment of the present disclosure.

A SID process according to embodiments of the present disclosure may be unique in that its approach is to avoid the relational database and joins altogether by performing superimposing data before the data store (as noted in FIG. 1). Relevant data may be kept separately, but it should be appreciated that relevant information may be added into the record upon discovery according to embodiments of the present disclosure. SID may avoid the process penalty of a join by superimposing data into the record. This not only may reduce the scope and cost of a join, but also may allow the related data to be time-specific.

Data may be stored in a document-based data store that supports multiple shard manner, such as elastic. Searching can be performed in parallel over multiple shards. Most of the latest NoSQL databases support this technique of multiple shards. SID according to embodiments of the present disclosure may be the best fit for the latest NoSQL databases in which data is stored in separated shards/partitions, and where cross-shard join would be either not allowed or too expensive in term of throughput.

Superimposing of event data according to embodiments of the present disclosure may be a process that uses a technique of creating a single record for multiple events that are sharing the same derived key. When new information is determined, it may be added (or superimposed) to an event record based on its derived key, as opposed to maintaining a streaming log or separate tables. In this process according to embodiments of the present disclosure, a single table may be maintained and searched, thereby providing quicker searches, and it also may allow for the merger of events from different data sources in embodiments of the present disclosure. The process of superimposed data according to embodiments of the present disclosure therefore may impact the complete lifecycle of organizing, storing and retrieving data.

Process Overview

Superimposed Data (SID) according to embodiments of the present disclosure may perform two counterintuitive steps as compared to processes that may employ a relational database approach: (1) SID may superimpose event records with matching derived keys (tuples) prior to indexing and storage (superimposed events); and (2) SID may create an attribute summary table with an attached schema for each attribute to record the cross-relationship with related attributes (superimposed attributes).

A SID process according to embodiments of the present disclosure may loosen the relationship between objects, thereby creating strong coupling between the attributes in the superimposed event. This strong coupling may be considered to break the rules of data relationship integrity. Data relationship integrity is the concept of having data appear only once in a database. An SID process according to embodiments of the present disclosure accepts flaws in the database, insofar as the gains in dataset size, pivoting speeds and searching speeds may allow for a more complete and quicker incident detection and response. SID introduces the concept of superimposed tagging that addresses part of the aspect of relationship integrity. Superimposed tags may append information to the results independent of the search and fetch.

A simplified overview flow of the SID process according to embodiments of the present disclosure may comprise the following steps:

(a) record normalization;
(b) superimposed events;
(c) superimposed attributes; and
(d) searching, fetching and tagging of superimposed data.

Record Normalization

In an SID process according to embodiments of the present disclosure, all messages may be parsed into pairing of an attribute and its data into an attribute-value pairing. An attribute without value may still exist with a null data association. Values of an attribute itself can contain a hierarchy. Attributes and their values may be defined by the parsing of the incoming messages in a process referred to as normalization.

Derived tuple fields may be used as a means to correlate events in embodiments of the present disclosure. A tuple may be a source address/port, destination address/port, and protocol combination or a subset of the tuple (such as source address/port and destination address). A network address, such as the source address and the destination address, may be defined as a system's Internet Protocol (IP) address in embodiments of the present disclosure.

Superimposed Event

Figure 4:
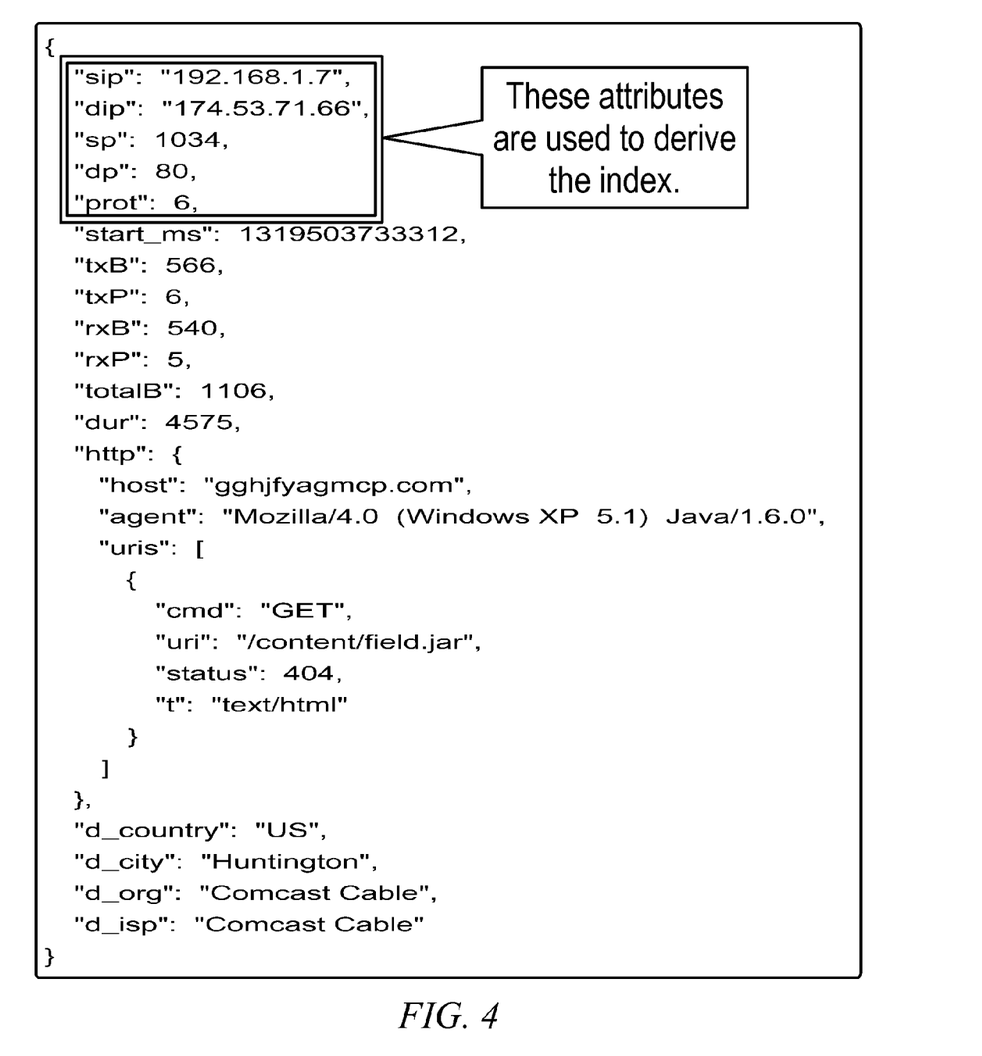
FIG. 4 depicts a JSON Tree representation of a superimposed event according to an embodiment of the present disclosure.

In an SID process according to embodiments of the present disclosure, an event may have a derived identifier, which may be the flow tuple index. The event may contain information in the form of attributes and their values. A typical event may be described in a JSON document as depicted in FIG. 4 according to an embodiment of the present disclosure.

New events may create a new record in the superimposed event window in embodiments of the present disclosure. Additional metadata may be added to the event in the insertion process. Attributes of an event may themselves be a tree or array of information. The derived key should be unique in the current sliding window according to embodiments of the present disclosure.

Figure 6:
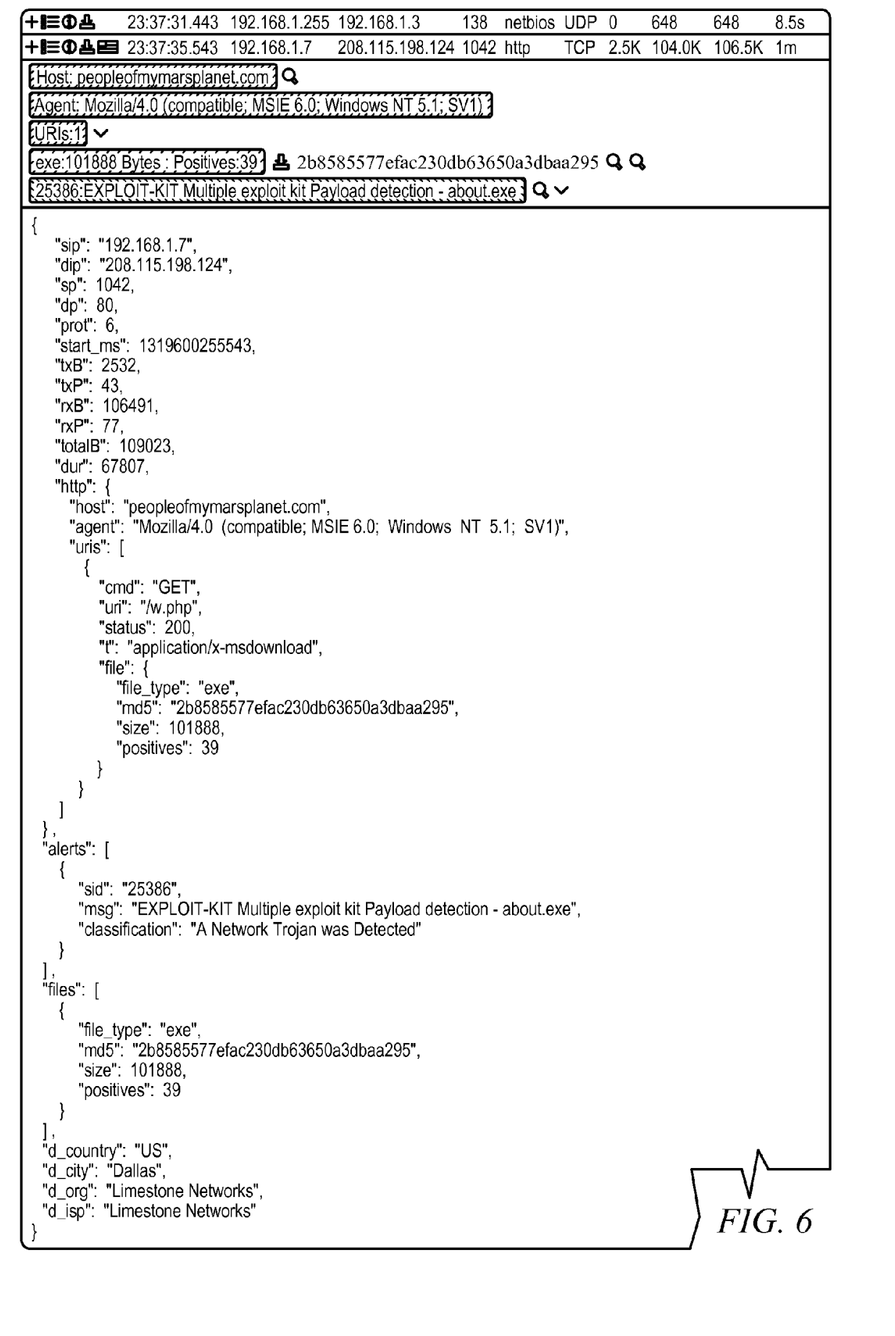
FIG. 6 depicts an example of a superimposed event's JSON tree from a system implementing the SID process according to an embodiment of the present disclosure.

Events that contain an existing derived key in the superimposed event window may be combined based on a defined schema for merger that may include means to resolve conflicts according to embodiments of the present disclosure. A simple merger may be based on a schema of appending new attribute data to the existing attribute. FIG. 6 depicts a fetched superimposed event according to an embodiment of the present disclosure. The fetched JSON field may then be represented in multiple means by the interface, user, or retrieving process according to embodiments of the present disclosure. FIG. 6 depicts a superimposed event from different data sources (in this case, network flow data, file capture and intrusion detection alerts) according to an embodiment of the present disclosure.

Superimposed events may be searched in a combination of predicates composing from any superimposed attributes according to embodiments of the present disclosure.

After a superimposed event expires from the current sliding window, the fully superimposed event may be sent to the superimposed attribute process according to embodiments of the present disclosure.

Superimposed Attributes

In an SID process according to embodiments of the present disclosure, attributes may be superimposed. After a message is parsed, the attribute-value pairings of that message may be added into a summary window. New pairings may be added into the window by adding a new record. The record for an attribute may contain multiple cross relationships to its associated attributes. A cross relationship is a collection of unique attribute pairings according to embodiments of the present disclosure.

All of the associated attribute-value pairings in the message may be superimposed in a cross relationship according to embodiments of the present disclosure. Each attribute may have a pre-defined relationship schema, which may specify the superimposed action to be taken for all associated attributes in embodiments of the present disclosure. If the attribute exists in the window, it should be appreciated that all associated values may be superimposed to the corresponding record following a pre-defined schema.

When the data is stored in the data store, each unique attribute may have a collection of cross relationships according to embodiments of the present disclosure. These relationships are converted into a singletree structure value. The attribute record may be stored with the value of the attribute as its key. The process according to embodiments of the present disclosure may dump the records into the data store when the window closes.

Searching and Fetching Superimposed Data

Figure 5:
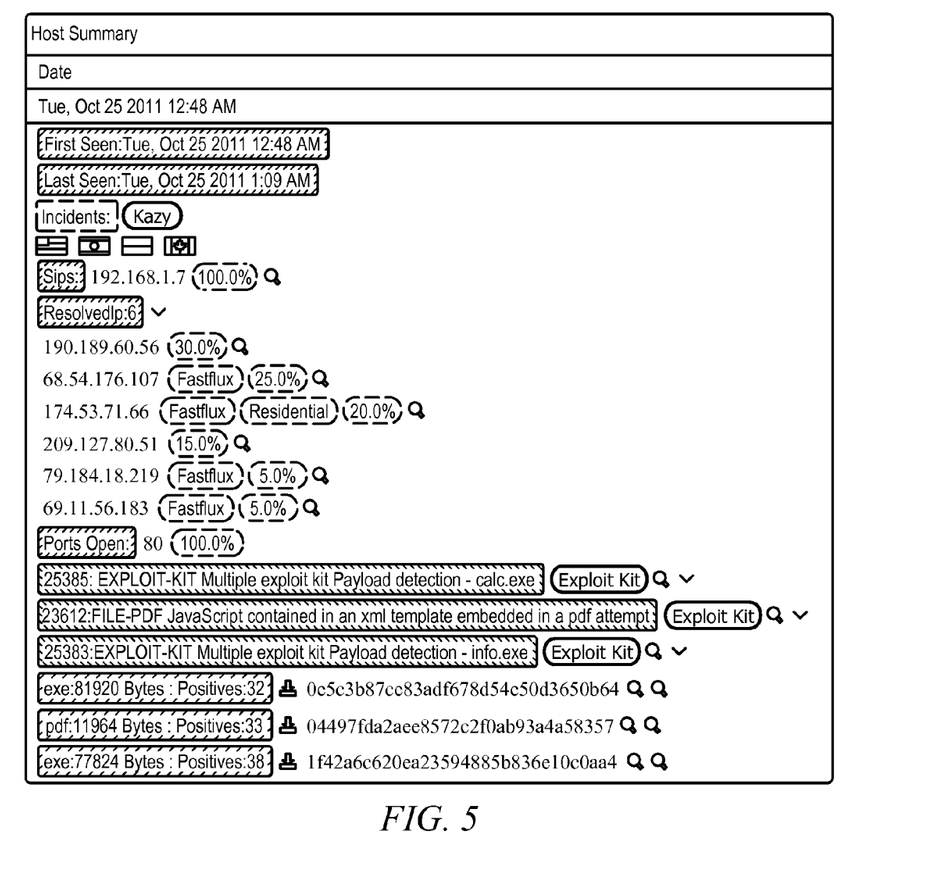
FIG. 5 depicts an example output from a system implementing superimposed data with tagged attribute-value pairings according to an embodiment of the present disclosure.

FIG. 5 depicts an example of the superimposed attribute data being fetched using the host name as a key according to an embodiment of the present disclosure. It should be appreciated that information relating to the key may be accessed in a single fetch without requiring a join in embodiments of the present disclosure.

The result of searches may then be subject to a process of superimposing tags. After the fetching of results, the results may be evaluated to determine if any attribute value matches the pre-registered attribute filter entries. When this occurs, the tag(s) attached to the filter entries may be appended to the attribute node in the original result document, as extra properties. As depicted in FIG. 5 according to an embodiment of the present disclosure, the marking of the host attributes, as being part of the "Kazy" attack, and alerts being part of an "Exploit Kit" may be examples of tags being added to a fetched result. These tags may be added after the fetching of the data, but before the presentation of the view to the user.

Superimposed tags according to embodiments of the present disclosure may reduce the need to update records in a large data store by storing tags filters in a smaller separate data store. Tagging at the search and fetch stage may also allow resulting data to be more timely and accurate than an approach that performs tagging prior to saving the data in a data store.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for gathering a plurality of data and representing the results in a computer environment, the method comprising:
    collecting the plurality of data, the plurality of data comprising network flow data, network alerts and system log data collectively comprising events, the events sharing a same derived key in an in-memory sliding window;
    superimposing, using a processor, the events sharing the same derived key in the in-memory sliding window into a single record to form superimposed events;
    superimposing, using the processor, associated attributes from the plurality of data into a cross relationship to form superimposed attributes, the cross relationship being a collection of unique attribute pairings;
    storing the superimposed events in a first computer readable data store; and
    storing the superimposed attributes in a second computer readable data store.

2. The method of claim 1 wherein the collecting further comprises collecting security event data, network event data, actionable intelligence, analysis results, or a combination thereof.

3. The method of claim 1 wherein events are information that combine a flow tuple into a derived key.

4. The method of claim 3 wherein the flow tuple comprises a source address, a destination address and a protocol.

5. The method of claim 4 wherein the flow tuple further comprises a source port and a destination port.

6. A method comprising:
    receiving network events at a first network node, the received network events containing a plurality of attributes and related values;
    superimposing, using a processor, the received network events to form superimposed events prior to their storage in a first computer readable data store, the superimposed events sharing a same derived key in an in-memory sliding window;
    examining each of the plurality of attributes to identify associated attributes;
    superimposing, using a processor, the associated attributes in a cross relationship prior to their storage in a second computer readable data store, the cross relationship being a collection of unique attribute pairings;
    storing the superimposed events in the first computer readable data store; and
    storing the superimposed attributes in the second computer readable data store.

7. The method of claim 6 wherein each of the plurality of attributes has a predefined relationship schema that specifies the superimpose action to be taken for all associated attributes.

8. The method of claim 6 further comprising:
    creating a new summary record in a current window when an examined attribute is new and does not exist in the current window.

9. The method of claim 6 further comprising:
    superimposing all associated attributes to a corresponding record following a pre-defined relationship schema when an examined attribute exists in a current window.

10. The method of claim 6 wherein each of the superimposed attributes has a collection of cross relationships when stored in the second computer readable data store.

11. The method of claim 10 further comprising:
    converting the collection of cross relationships into a single tree structure.

12. The method of claim 11 further comprising:
    storing the single tree structure into the second computer readable data store with the value associated with the attribute as its key.

13. A method comprising:
    receiving a first plurality of messages at a network node in a first timeframe and receiving a second plurality of messages at the network node in a second timeframe, each of the first and second plurality of received messages comprising a plurality of attribute-value pairs, each of the plurality of attribute-value pairs in each of the first and second plurality of received messages corresponding to at least one network event;
    deriving keys, using a processor, for each of the first and second plurality of received messages from at least one of the plurality of attribute-value pairs in the respective received message;
    superimposing the first plurality of received messages, using a processor, by merging the first plurality of received messages that have a same derived key value into a first superimposed record;
    superimposing the second plurality of received messages, using a processor, by merging the second plurality of received messages that have a same derived key value into a second superimposed record;
    superimposing the pluralities of attribute-value pairs, using a processor, by cross-relating each of the plurality of attribute-value pairs for each of the first and second plurality of received messages to each other attribute-value pair of the plurality of attribute-value pairs in the respective received message;
    storing the first and second superimposed records in a first computer readable data store; and
    storing the superimposed attribute-value pairs in a second computer readable data store.

14. The method of claim 13 wherein the at least one network event is a communication over a network.

15. The method of claim 13 wherein each of the derived keys comprises an address of a source network node of the respective network event, an address of a destination network node of the respective network event, and a protocol of the respective network event.

16. The method of claim 15 wherein each of the derived keys further comprise a port of the source network node of the respective network event and a port of the destination network node of the respective network event.

17. The method of claim 13, wherein each of the superimposed attribute-value pairs has a collection of cross relationships when stored in the second computer readable data store.

18. The method of claim 17 further comprising:
- converting the collection of cross relationships into a single tree structure.

19. The method of claim 18 further comprising:
- storing the single tree structure into the second computer readable data store with the value of the attribute-value pair as the key.

* * * * *